[11] 3,597,755

| | | | |
|---|---|---|---|
| [72] | Inventor | William J. Parkin Wayland, Mass. | |
| [21] | Appl. No. | 732,757 | |
| [22] | Filed | May 28, 1968 | |
| [45] | Patented | Aug. 3, 1971 | |
| [73] | Assignee | Sanders Associates, Inc. Nashua, N.H. | |

[54] ACTIVE ELECTRO-OPTICAL INTRUSION ALARM SYSTEM HAVING AUTOMATIC BALANCING MEANS
8 Claims, 6 Drawing Figs.

[52] U.S. Cl. .................................................. 340/258,
250/83.3, 250/199, 340/228
[51] Int. Cl. .......................................................G08b 13/18,
G01t 1/16
[50] Field of Search............................................340/258,
258 B, 228 S; 250/94.5, 83.3 IR, 211, 199;
325/475, 473

[56] References Cited
UNITED STATES PATENTS

| | | | |
|---|---|---|---|
| 2,912,683 | 11/1959 | Bagno | 340/258 |
| 3,015,034 | 12/1961 | Hanlet | 250/211 |
| 3,167,739 | 1/1965 | Girard et al. | 340/258 UX |
| 3,245,002 | 4/1966 | Hall | 331/94.5 |
| 3,370,284 | 2/1968 | Bagno | 340/258 |
| 3,444,544 | 5/1969 | Pearson et al. | 340/258 |
| 3,470,374 | 9/1969 | Jones | 250/83.3 |
| 3,284,633 | 11/1966 | Hathaway | 250/199 |
| 3,287,556 | 11/1966 | Good | 250/199 UX |
| 3,430,047 | 2/1969 | Hurkamp | 250/199 |
| 3,132,339 | 5/1964 | Boughnou | 325/473 UX |
| 3,213,450 | 10/1965 | Goor | 325/475 X |
| 3,353,147 | 11/1967 | Meeker, Jr. | 325/473 X |

*Primary Examiner*—John W. Caldwell
*Assistant Examiner*—Perry Palan
*Attorney*—Louis Etlinger

ABSTRACT: An active reflected energy optical intruder detection system wherein changes in reflected energy received by the system indicate the entry, exit or change of position of an object within the field-of-view. An automatic balancing means is included in the receiving portion of the apparatus whereby large background signals are balanced out such as to improve the sensitivity of the apparatus.

INVENTOR
WILLIAM J. PARKIN

ATTORNEY

INVENTOR
WILLIAM J. PARKIN

ATTORNEY

ACTIVE ELECTRO-OPTICAL INTRUSION ALARM SYSTEM HAVING AUTOMATIC BALANCING MEANS

BACKGROUND OF THE INVENTION

1. Field of the Invention

The present invention relates to electro-optical systems and more particularly to active, reflected energy optical intrusion detection systems having automatic balancing means for improved background signal rejection.

2. Description of the Prior Art

Prior to the present invention electro-optical intrusion detection and alarm systems were basically of two types; passive systems and interrupted beam systems. Passive systems involve the monitoring of a volume of space with an infrared receiver and detecting the presence of an intruder by the thermal contrast between the intruder and the background against which he is viewed. In general, intruder detection systems are required to detect the presence of a normally clothed man against a background environment which may be of a temperature which is less than, equal to or greater than that of the intruder. Normal operating conditions may or may not include the presence of visible radiation. Under these conditions there is no guarantee of either thermal or visible contrast between the intruder and the background and, lacking such contrast, passive systems produce no signal and the intruder remains undetected. Additional problems encountered with passive systems arise as a result of the relatively long wavelength at which a normally clothed man radiates infrared energy. This radiation has been found typically to peak at approximately 9.5 microns which requires the use of cooled photoconductive detectors. Bolometers as a practical matter may be eliminated from consideration due to their characteristically slow response.

In interrupted beam intrusion detection systems a transmitter is aimed at a receiver to effectively establish a narrow beam of radiant energy between the two units. Any interruption of this beam is indicative of the presence of an intruder. The disadvantages of this type of intrusion detection system lie in the requirement of multiple stations either in the form of separated transmitters and receivers or a colocated transmitter and receiver used with a reflector to return the transmitted beam to the receiver. The optical beam widths of interrupted beam intrusion alarm systems are of necessity very narrow to insure complete interruption by an intruder; i.e. they must be of dimensions smaller than the intruder. The small beam widths result in requirements for precise alignment and rigid mounting of the system transmitter, receiver and reflectors if any are used. Further if the transmitter and receiver are remotely located, interconnecting wires are generally required to run between the stations. The interconnecting wires may be eliminated by using a colocated transmitter and receiver with a remote reflector, however, the optical alignment accuracy required is twice that of the remote station interrupted beam system.

SUMMARY AND OBJECTS OF THE INVENTION

The present invention provides a new and novel intruder detection system which senses a change in the level of reflected energy when an intruder enters, exits or moves within the system field-of-view. According to this invention an area to be monitored for the presence of intruders is illuminated with radiant energy from a transmitter. In the absence of an intruder this energy is reflected by a background in a manner which is substantially constant with respect to time. The reflected energy is collected by a receiver which produces a steady state electrical output signal in response to the energy reflected by the background. When an intruder enters, exits or changes position within the area being monitored there is a resultant change in the level of the reflected energy incident on the receiver. This change in the level of received energy causes the receiver output signal level to change. The receiver output is coupled to a signal processor which produces an output in response to time varying input signals. Thus a signal processor output is indicative of the entrance into, exit from or change of position of an intruder within the system field-of-view. This output signal may then be applied to an external utilization means such as an alarm.

In practice the present invention provides the capability to monitor a wide field-of-view with a high probability of detection and low false alarm rate. No precision alignment is required and once in operation it is substantially immune to defeat by presently known countermeasures.

Therefore it is a primary object of the present invention to provide a new and novel intruder detection system which senses a change in reflected energy caused by an intruder entering into, exiting from or moving within the system field-of-view.

It is another object of the present invention to provide apparatus of the above-described character which is covert in its operation.

It is an additional object of the present invention to provide apparatus of the above-described character having an adjustable field-of-view.

It is a further object of the present invention to provide apparatus of the above-described character which may be fabricated in a completely self-contained unit.

It is yet another object of the present invention to provide apparatus of the above-described character wherein high-intensity background reflections are automatically balanced out of the signal processor.

These and other objects, features and advantages of the present invention will become more apparent from the detailed discussion considered in conjunction with the accompanying drawings. The scope of the invention will be indicated in the claims.

DESCRIPTION OF THE PREFERRED EMBODIMENT

Figure 1:
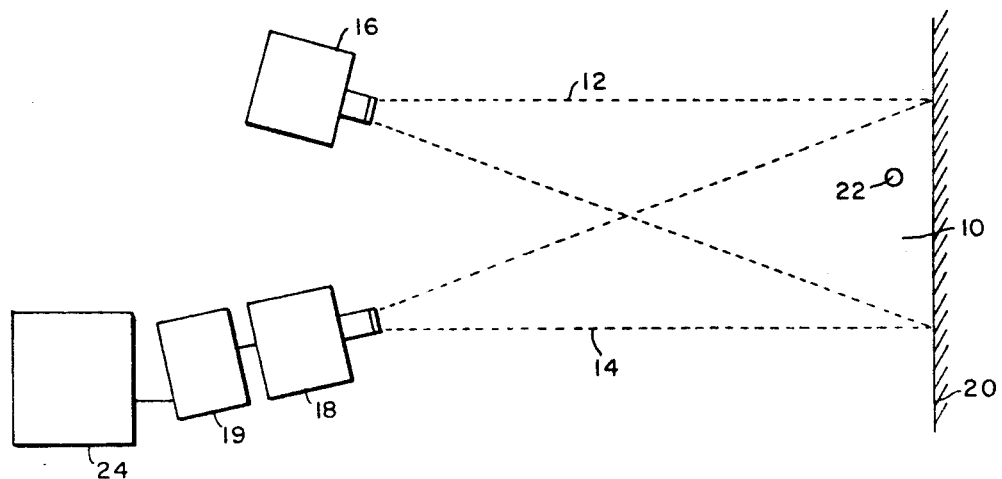
FIG. 1 is a schematic representation of the present invention.

Referring now to FIG. 1 there is illustrated a schematic representation of the present invention wherein a volume of space 10 is to be monitored for intruders. The volume of space 10 to be monitored is defined by the volume wherein the fields-of-view 12 and 14 of an illuminator 16 and receiver 18 respectively are coincident. The illuminator 16 generates and directs radiant energy into its field-of-view 12. In the absence of an intruder the illumination energy is reflected by some background generally indicated at 20 which may be for example a wall of a room being monitored in a manner which is substantially time invarient. A portion of this constant reflected energy is received by the receiver 18 and results in a receiver output signal which is substantially time invariant. The signal processor 19, which is described more fully hereinbelow, is characterized in its operation as nonresponsive to time variant energy and thus will normally have no output. When some physical body 22, such as a man, enters the volume of space 10 being monitored there is a change in the level of the energy reflected back to the receiver 18. Thus there is a corresponding change in the signal produced in the receiver 18 to which the signal processor 19 is responsive in producing an output signal indicating an intruder which then may be used to activate a utilization means 24 such as an audio or visual alarm, recording means, transmitter or the like. It will be noted that there is no requirement for precision alignment of the illuminator means 16 and receiver means 18 and detection may take place whenever an intruder enters, exits or moves within the area of coincidence of the fields-of-view 12 and 14.

Figure 2:
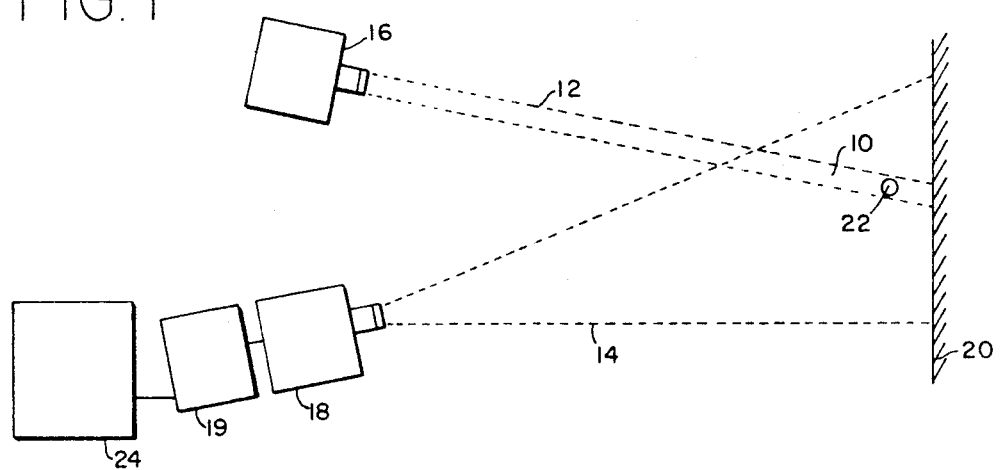
FIG. 2 is a schematic representation of an alternative embodiment of the present invention.

An alternative embodiment of the present invention is illustrated in FIG. 2 wherein like numbers identify like elements as shown in FIG. 1. In this embodiment there is less waste of illumination energy since the field-of-view 12 is considerably smaller. Obviously, however, the volume of space 10 which may be monitored is proportionately less. In order to provide maximum flexibility in the application of the present invention adjustable fields-of-view 12 and 14 of the illuminator 16 and receiver 18 respectively may be provided.

Figure 3:
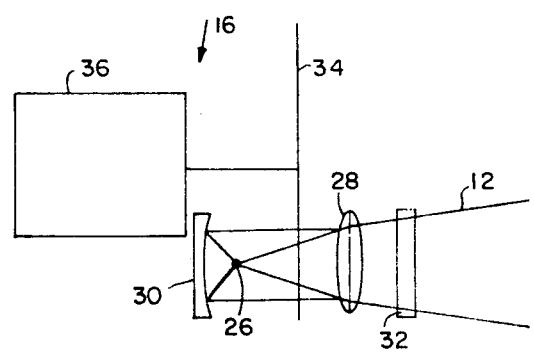
FIG. 3 is a schematic illustration of one embodiment of the illumination means of the present invention.

FIG. 3 is a more detailed schematic representation of one embodiment of an illuminator 16 which may be used to advantage in the practice of the present invention. In this embodiment energy from a radiant energy source 26 is incident upon a lens 28 whereby the energy is directed into a preselected field-of-view 12. A reflector 30 is provided to reflect energy, which would otherwise be lost, into the lens 28 thus increasing the efficiency of the illuminator 16. Typically an intruder alarm is required to produce substantially no radiation in the visible region of the spectrum, thus an infrared pass filter 32 is provided to prevent the transmission of any visible radiation. Specific radiation sources which would be amenable for use with the present invention would include "-black body" thermal types, filament or arc lamps and solid-state laser devices. Although generally less desirable, sources of visible or ultraviolet energy could also be used. Since background radiation levels and rates of change are generally unpredictable for all potential applications of the present invention it is preferred that the illuminator output radiation be modulated at some preselected frequency. It is to be noted, however, that the invention will operate satisfactorily using unmodulated illumination. This modulation ideally should approach 100 percent to enhance system efficiency and the modulation frequency should be high enough to reduce the false alarm rate produced by background illumination level changes and distinct from the modulation frequency of any AC lighting devices used in a room being monitored. When used in an outdoor environment the depth of illuminator modulation may be significantly less than 100 percent. Generally 10 to 20 percent has been found adequate to preclude false alarms arising from naturally occuring changes in background illumination. Since the signal processor 19 will preferably be tuned to respond to the modulated illumination, stability of the modulation frequency is generally more desirable than providing a frequency reference from the illuminator 16 to the signal processor 19. Means of providing such modulation of the illumination energy include a mechanical chopper wheel 34 driven by a chopper motor 36 or, in the alternative electromagnetically driven ronchi rulings.

Figure 3A:
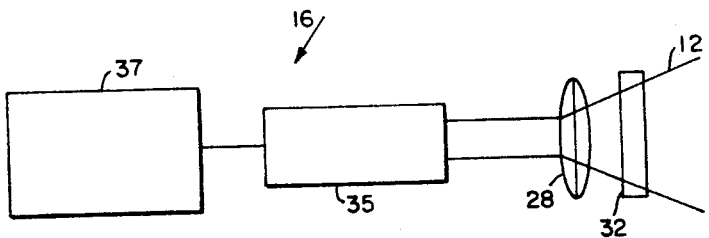
FIG. 3A is a schematic illustration of an alternative embodiment of the illumination means of the present invention.

As stated above the source of radiant energy may be a solid-state laser device. An illuminator of this character is schematically illustrated in FIG. 3A wherein the output of a solid-state laser 35 such as a gallium arsenide diode is directly modulated by an electronic modulator 37. The laser output is then directed into the preselected field-of-view 12 by a lens 28 through an infrared pass filter 32 as described above.

As indicated above it may be desirable to provide an adjustable field-of-view 12 for the illuminator 16. This capability may easily be provided by using a lens 28 having a variable focal length.

Figure 4:
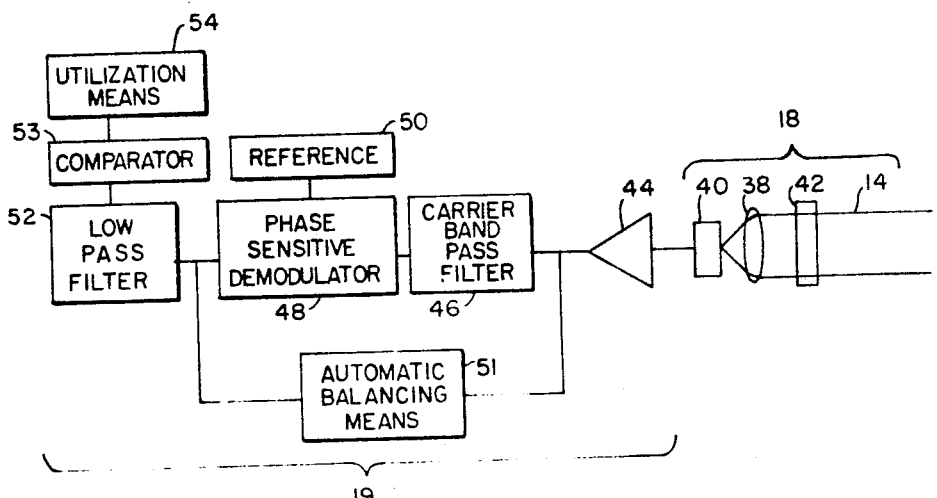
FIG. 4 is a schematic representation of one embodiment of the receiver and signal processing means of the present invention.

A more detailed schematic representation of a receiver 18 and signal processor 19 which may be used with the present invention is illustrated in FIG. 4. The reflected energy from the target or intruder will be radiated in an approximately hemispherical pattern distributed either uniformly as from a diffuse reflector or as in cosine function from a Lamertian reflector. In either case only a small portion of the reflected energy is collected by the optical aperture of the receiver 18.

This energy is collected by a receiving lens 38 and focused thereby on a photodetector 40 such as lead sulfide, lead selenide or lead telluride photoconductor. Again, if desired, the lens 38 may be of the variable focal length type to provide an adjustable field-of-view for the receiver 18. An optical filter 42 having the same spectral band-pass as the filter 32 in the illuminator 16 is provided to reduce the effects of spurious radiation such as sunlight, fluorescent and incandescent lighting or miscellaneous reflections. The detector 40 is typically a high-impedance device and generally produces signals that lie in the millivolt or microvolt region. Thus the detector output, which is an AC signal at the carrier frequency of the illuminator, is applied to the signal processor 19 through a high input impedance and relatively high gain amplifier 44. The output of the amplifier 44 is applied to a carrier band-pass filter 46 which serves to reduce or eliminate the effect of extraneous radiation within the optical band-pass of the filter 42 which may be incident on the detector 40. The output of the filter 46 is coupled to a phase-sensitive demodulator 48 which produces a DC signal corresponding to the root mean square amplitude of the AC carrier input. A phase reference input is also provided to the demodulator 48 from a reference source 50. The DC output of the demodulator 48 represents the return signal from the background 14. Thus any decrease or increase in the amplitude of the DC output of the demodulator indicates the exit or entrance of a reflecting object from or into the field-of-view 14. A large but stationary reflecting object located within the field-of-view 14 will reflect strongly and produce a large output from the detector 40. Thus when an intruder enters the field-of-view 14 at a greater distance from the receiver 18 than the stationary object he will cause a very small relative change in the detector output level which would be difficult if not impossible to detect. To circumvent this problem an automatic balancing circuit 51 is provided in a feedback loop from the demodulator 48 to the input of the carrier band-pass filter 46. The automatic balancing circuit 51 provides a signal at the carrier frequency but 180° out of phase and of an amplitude which is controlled by the magnitude of the demodulator 48 output. Large background signals are thus balanced out such as to have no degrading effect on the probability of detecting an actual intruder. The output of the demodulator 48 is also coupled through a low pass filter 52 to a comparator 53. The cutoff frequency of the filter 52 establishes the time constant of the system. The comparator 53 senses only changes in the DC signal level rather than time invariant DC. The output signal of the comparator 53 is then coupled to a utilization means 54 which may be for example an alarm, photographic apparatus or a radio transmitter. The above-described receiver and signal processor is not polarity sensitive and will respond to any change in the level of received radiation either positive or negative lying within the electrical bandwidth of the system. Thus the sudden removal of an object from the field-of-view will produce a usable output. If an intruder should move very slowly into the field-of-view such as would be possible in the system were used outdoors, an output would be produced either when his rate of approach increased or when he left the field-of-view.

Figure 5:
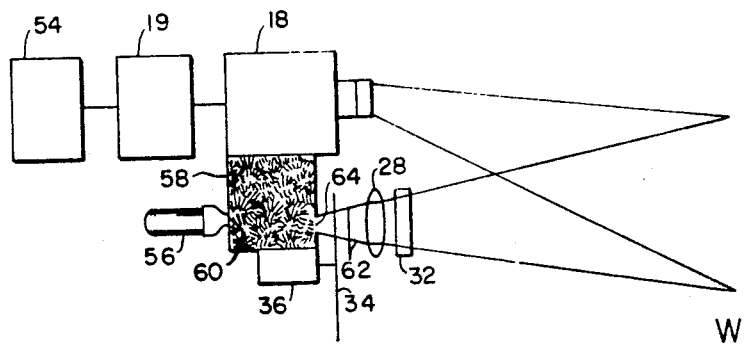
FIG. 5 is a schematic representation of a self-contained embodiment of the present invention.

A self-contained intrusion detection system may be fabricated according to the present invention which could be emplaced and left unattended for extended periods of time to maintain surveillance of a preselected area. In such a system an electrically powered source of radiant energy is impractical due to the amount of power required. Thus, as illustrated in FIG. 5 a bottled-gas-fired heater may be used where a gas such as butane, propane or the like supplied from a bottle 56 is burned in a container 58 of high-emissivity metal wool or powder 60. Infrared energy, schematically shown as rays 62, is emitted by the metal 60 through an aperture 64 in the container 58. It is herein to be noted that, although a gas-fired heater is described herein for purposes of illustration, other chemical fuel sources of radiant energy would be equally applicable. Such other sources would include those of the catalytic reactive or even nuclear types. The remainder of the illuminator elements; specifically the lens 28, infrared pass filter 32 chopper wheel 34 and chopper motor 36 are as described with reference to FIG. 3. The receiver 18 and signal processor 19 may also be of the above-described character. Should it be desirable to monitor an extended area with a number of detection systems and from a remote location the utilization means 54 to which the signal processor 19 output is coupled may be a radio transmitter. In this manner no wires need run to or from the detection system which might betray its existence or location. This feature would be of major significance in potential military applications of the present invention.

It will thus be seen that the objects set forth above, among those made apparent from the preceding descriptions, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention therein described, and all statements of the scope of the invention, which, as a matter of language, might be said to fall therebetween.

Having described which is new and novel and desired to secure by Letters Patent, which I claim is:

1. An intrusion detection system comprising
means for illuminating a preselected volume of space with amplitude-modulated radiant energy of a preselected carrier frequency such that said energy will be incident upon and reflected by objects entering, moving within and exiting said volume;
means for receiving said reflected radiant energy having a field-of-view which is at least partially coincident with said illuminated volume of space, including means for collecting and focusing radiant energy reflected from said objects within said coincident portion of said field-of-view, and a single photodetector disposed in the focal plane of said collecting and focusing means, said photodetector producing an electrical output signal which is representative of the level of radiant energy received thereby; and
signal processing means coupled to said photodetector, including an electrical band-pass filter coupled to said photodetector and tuned to said preselected frequency, a phase-sensitive demodulator coupled to the output of said band-pass filter, a low pass filter coupled to the output of said demodulator, a signal comparator coupled to the output of said low pass filter, and an automatic balancing means coupled between the output of said demodulator and the input of said band-pass filter whereby an inverted signal at said carrier frequency and of an amplitude controlled by the output level of said demodulator is coupled to the input of said band-pass filter to thereby substantially cancel time invariant background signals, and producing an output signal in response only to changes in the level of said received radiant energy.

2. Apparatus as recited in claim 1 wherein
said illuminating means includes a variable focus lens whereby the dimensions of said illuminated volume of space may be selected from a range of values, and
said collecting and focusing means comprises a variable focus lens whereby the dimensions of said receiving means field-of-view may be selected from a range of values.

3. Apparatus as recited in claim 1 wherein
said radiant energy is infrared radiant energy.

4. Apparatus as recited in claim 1 wherein
said illuminating means includes a thermal energy source comprising an insulated container having an exit aperture, and being substantially filled with a highly emissive metallic wool material, and a gas-fired burner for heating said metallic wool whereby thermal energy from said heating means is absorbed by said metallic wool and reradiated as infrared radiant energy through said exit aperture, and a rotating chopper disposed adjacent said exit aperture.

5. Apparatus as recited in claim 1 wherein
said illuminating means includes a solid-state laser device, and an electronic modulator coupled to said laser device.

6. Apparatus as recited in claim 5 wherein
said solid-state laser device is a gallium arsenide diode.

7. Apparatus as recited in claim 1 further including
substantially identical infrared band-pass optical filters; one disposed adjacent said illuminating means in the path of said illuminating radiant energy, and one disposed adjacent said collecting and focusing means in the path of said reflected radiant energy.

8. Apparatus as recited in claim 1 wherein
said photodetector is selected from the group of photoconductors consisting of
lead sulfide
lead selenide, and
lead telluride.